US008773418B2

(12) United States Patent
Hsieh et al.

(10) Patent No.: US 8,773,418 B2
(45) Date of Patent: Jul. 8, 2014

(54) DISPLAY PANEL DRIVING CIRCUIT, DISPLAY PANEL, AND DRIVING METHOD THEREOF

(75) Inventors: Sheng-Liang Hsieh, Hsin-Chu (TW); Chun-Kuei Wen, Hsin-Chu (TW); Shih-Chieh Kuo, Hsin-Chu (TW); Che-Hsien Chen, Hsin-Chu (TW); Chao-Ching Hsu, Hsin-Chu (TW)

(73) Assignee: AU Optronics Corp., Science-Based Industrial Park, Hsin-Chu (TW)

( * ) Notice: Subject to any disclaimer, the term of this patent is extended or adjusted under 35 U.S.C. 154(b) by 675 days.

(21) Appl. No.: 12/779,054

(22) Filed: May 13, 2010

(65) Prior Publication Data

US 2011/0090199 A1 Apr. 21, 2011

(30) Foreign Application Priority Data

Oct. 16, 2009 (TW) ................................ 98135107 A

(51) Int. Cl.
*G06F 3/038* (2013.01)
*G06G 5/00* (2006.01)
*G09G 3/36* (2006.01)
*G09G 5/10* (2006.01)

(52) U.S. Cl.
USPC ................. 345/211; 345/87; 345/94; 345/98; 345/690

(58) Field of Classification Search
USPC ................ 315/291, 312; 324/762.02; 326/30; 330/253, 255, 258; 331/15; 345/76, 83, 345/87, 89, 98, 100, 211, 690, 97, 207, 345/212; 363/97; 398/202; 84/312 R
See application file for complete search history.

(56) References Cited

U.S. PATENT DOCUMENTS

| | | | | |
|---|---|---|---|---|
| 6,222,516 | B1 | 4/2001 | Oda | |
| 8,022,916 | B2 * | 9/2011 | Lee et al. | 345/94 |
| 8,330,747 | B2 * | 12/2012 | Nakanishi et al. | 345/207 |
| 2003/0099233 | A1 * | 5/2003 | Bae et al. | 370/389 |
| 2003/0185028 | A1 * | 10/2003 | Horimoto | 363/97 |
| 2005/0007324 | A1 * | 1/2005 | Inada | 345/87 |
| 2005/0017992 | A1 * | 1/2005 | Kudo et al. | 345/690 |
| 2006/0119295 | A1 * | 6/2006 | Ahn et al. | 315/320 |
| 2006/0145961 | A1 * | 7/2006 | Hu | 345/76 |
| 2006/0187173 | A1 * | 8/2006 | Moon | 345/98 |
| 2007/0017341 | A1 | 1/2007 | Nishida | |
| 2007/0146260 | A1 * | 6/2007 | Kang | 345/87 |
| 2007/0296456 | A1 * | 12/2007 | van der Goes et al. | 326/30 |
| 2009/0015528 | A1 * | 1/2009 | Sheu | 345/87 |
| 2010/0045651 | A1 * | 2/2010 | Kim | 345/212 |
| 2010/0218661 | A1 * | 9/2010 | Hagemeyer et al. | 84/312 R |

FOREIGN PATENT DOCUMENTS

| | | | |
|---|---|---|---|
| KR | 1020060116587 A | 11/2006 | |
| WO | WO 2009/057561 * | 5/2009 | G09G 3/20 |

* cited by examiner

*Primary Examiner* — Quan-Zhen Wang
*Assistant Examiner* — Lin Li
(74) *Attorney, Agent, or Firm* — Winston Hsu; Scott Margo

(57) ABSTRACT

By following properties that there is coupled noise, which is coupled from a display panel, within at least one common voltage used on the display panel, the at least one common voltage is fed-back into a pixel electrode driving module, and driving voltages are generated accordingly, so that the generated driving voltages carry noises closes to coupled noises of the display panel. As a result, while the driving voltages carrying noises from the at least one common voltage, the pixel electrode driving module is capable of driving a corresponding pixel electrode with a stable voltage difference, and thereby capable of relieving horizontal crosstalk and raising a display quality of the display panel.

25 Claims, 8 Drawing Sheets

DISPLAY PANEL DRIVING CIRCUIT, DISPLAY PANEL, AND DRIVING METHOD THEREOF

BACKGROUND OF THE INVENTION

1. Field of the Invention

The present invention relates to a display panel driving circuit, a display panel, and driving method thereof, and more particularly, to a display panel driving circuit, a display panel, and driving method thereof for relieving horizontal crosstalk.

2. Description of the Prior Art

Polarity inversion is often used on a conventional display panel. Please refer to FIG. 1, which is a schematic diagram for describing polarity inversion in conventional technologies of display panels. In FIG. 1, polarities on a transistor array of a display panel are illustrated. While the display panel displays a pixel of each transistor on the transistor array, polarity inversion of each the transistor is performed corresponding to each pixel on the display panel according to a certain order indicating alternative voltages, i.e., transforming a positive polarity into a negative polarity and vice versa. However, since data voltages transmitted to each the transistor on the display panel may interrupt driving voltages of corresponding pixel electrodes in forms of noises, and bring blurs as a result, display quality of the display panel is therefore disturbed, where such noises or blurs indicate horizontal crosstalk on the display panel.

SUMMARY OF THE INVENTION

The claimed invention is directed to a display panel driving circuit. The display panel driving circuit comprises a plurality of pixel electrode driving modules and a voltage feedback module. The plurality of pixel electrode driving modules is connected in series. The voltage feedback module is coupled to one of the plurality of pixel electrode driving module, for providing the coupled pixel electrode driving module with at least one feedback voltage. The at least one feedback voltage is provided by a display panel. The pixel electrode driving module is capable of driving a corresponding pixel electrode according to the provided at least one feedback voltage.

The claimed invention is directed to a method of driving display panel for neutralizing horizontal crosstalk. The method comprises providing at least one feedback voltage provided by a display panel to one of a plurality of pixel electrode driving module connected in series; and the pixel electrode driving module driving a corresponding pixel electrode according to one of the at least one provided feedback voltage.

The claimed invention is directed to a display panel. The display panel comprises a panel and a display panel driving circuit. The display panel driving circuit comprises a plurality of pixel electrode driving modules and a voltage feedback module. The plurality of pixel electrode driving modules are connected in series. The voltage feedback module is coupled to one of the plurality of pixel electrode driving module, for providing the coupled pixel electrode driving module with at least one feedback voltage. The at least one feedback voltage is provided by a panel. The pixel electrode driving module is capable of driving a corresponding pixel electrode according to the provided at least one feedback voltage.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
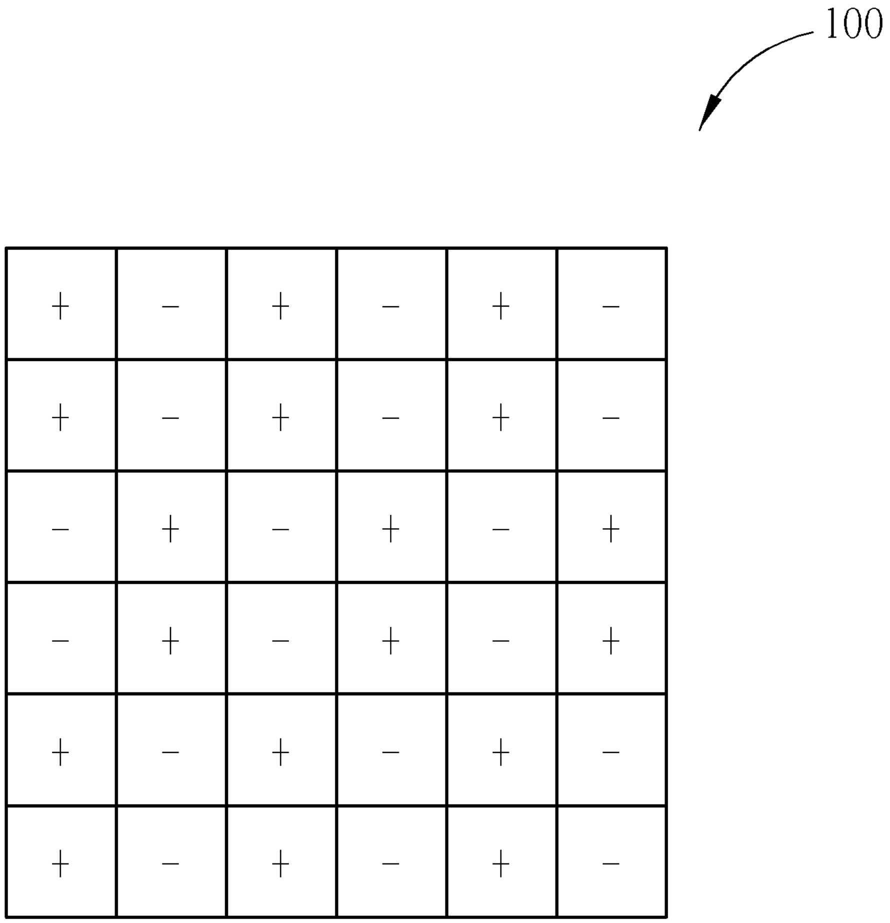
FIG. 1 PRIOR ART
FIG. 1 is a schematic diagram for describing polarity inversion in conventional technologies of display panels.
Figure 2:
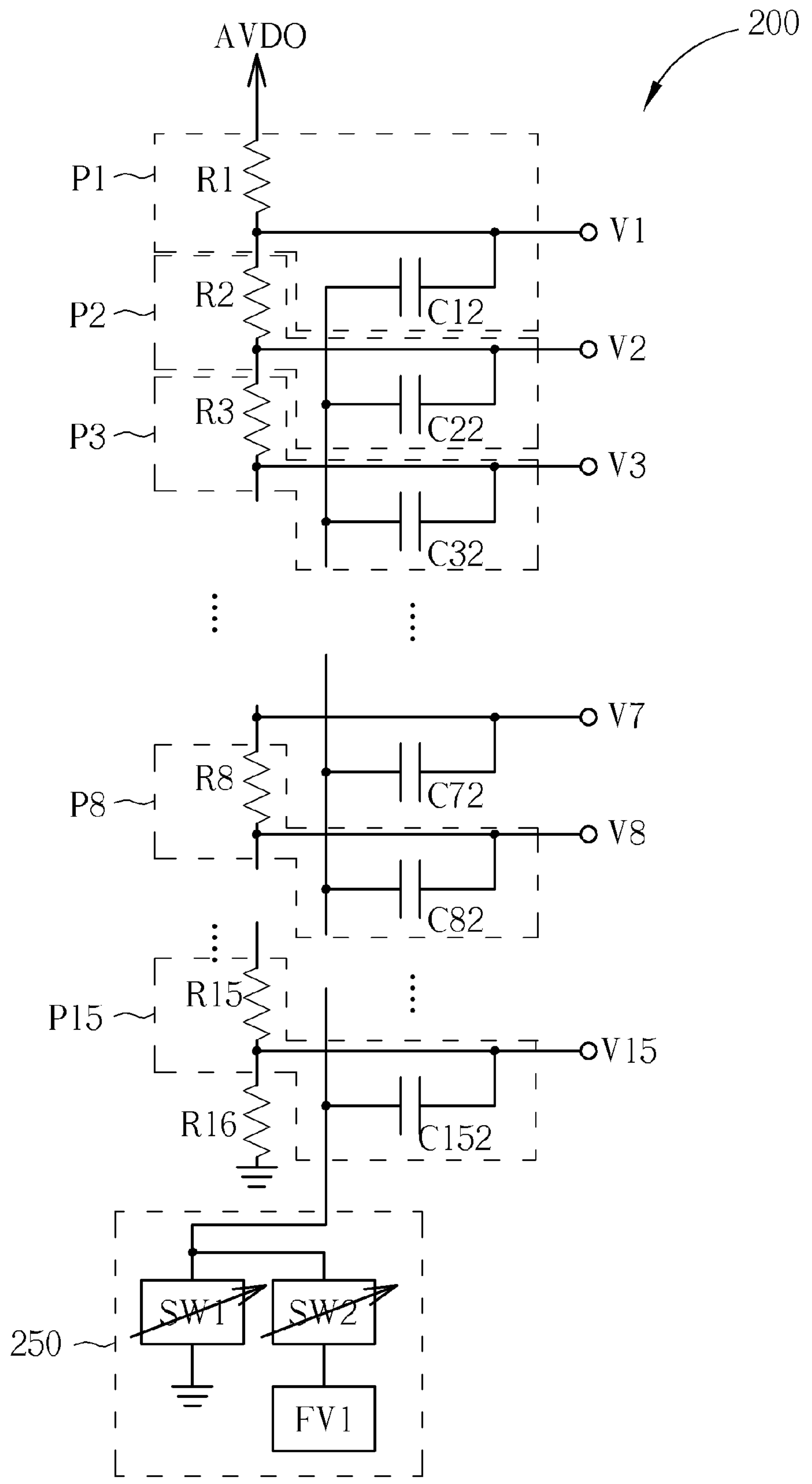
FIG. 2 is a diagram of a display panel driving circuit disclosed according to a first embodiment of the present invention.
Figure 3:
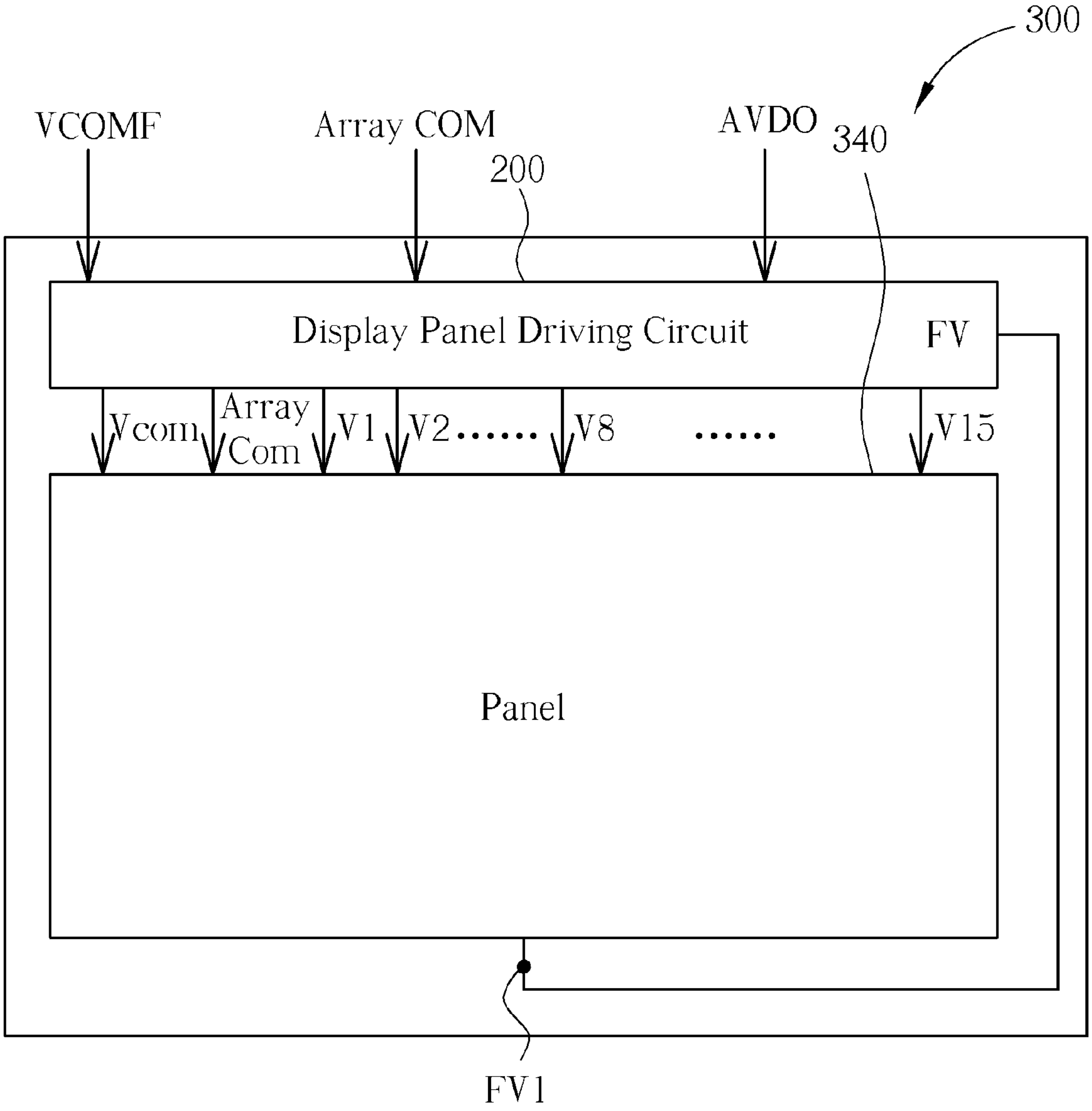
FIG. 3 is a diagram of a display panel including the display panel driving circuit shown in FIG. 2.

Please refer to FIG. 2 and FIG. 3. FIG. 2 is a diagram of a display panel driving circuit 200 disclosed according to a first embodiment of the present invention. FIG. 3 is a diagram of a display panel 300 including the display panel driving circuit 200 shown in FIG. 2. The display panel 300 shown in FIG. 3 includes the display panel driving circuit 200 shown in FIG. 2 and a panel 340. There are a plurality of data lines and a plurality of transistors arranged in an array on the panel 340; where the plurality of data lines and transistors are not shown for brevity of the above diagrams. A common voltage level VCOMF is used on the panel 340 for acting as a reference voltage level, which is used for determining driving voltage differences of the pixel electrodes on the panel 340; in other words, a voltage difference between the common voltage level VCOMF and the driving voltage of a single pixel electrode is the voltage difference used for practically driving the pixel electrode. There is also a common voltage source ArrayCOM used on the panel 340 for serving as a common voltage used by each pixel electrode on the panel 340, and the common voltage source ArrayCOM also serves as a required common voltage level while a transistor array of the panel 340 stores voltages. For example, when the voltage difference for driving a single pixel electrode is higher than the common voltage source ArrayCOM, a polarity indicated by the single pixel electrode is positive; else, the polarity is negative. While the common voltage source ArrayCOM is provided to the panel 340, noises brought by a grounded capacitor of each the pixel electrode is coupled to a common voltage FV. The display panel driving circuit 200 is used for driving a plurality of transistors and pixel electrodes corresponding to the plurality of transistors on the panel 340 respectively, and therefore, driving voltages V1, V2, . . . , V8, . . . , and V15 are required while driving the plurality of transistors and pixel electrodes. The display panel driving circuit 200 shown in FIG. 2 receives the common voltage FV, which brings noises, on the panel 340 so that the noises within the common voltage FV are capable of being close to synchronous with noises along with the driving voltages V1, V2, . . . , V8, . . . , and V15 so as to relieve the horizontal crosstalk.

As shown in FIG. 2, the display panel driving circuit 200 includes a plurality of connected-in-series pixel electrode driving module P1, P2, P3, . . . , P8, . . . , and P15, and a voltage feedback module 250. The plurality of pixel electrode driving module P1, P2, P3, . . . , P8, . . . , and P15 are provided with a voltage source AVDO for required power, where the voltage source AVDO may be provided by the display panel 300 or an additional circuit board, which is not illustrated herein for brevity. The voltage feedback module 250 is coupled to one of the plurality of pixel electrode driving module for providing at least one feedback voltage to the pixel electrode, for example, providing the at least one feedback voltage to the pixel electrode P1 or P8, where the at least one feedback voltage may be the common voltage FV1 or FV2, or a ground voltage. Each of the plurality of pixel electrode driving modules P1, P2, P3, . . . , P8, . . . , and P15 preferably includes a regulating capacitor and a resistor, where the regulating capacitor has a first terminal coupled to a first terminal of the resistor, and has a second terminal coupled to the voltage feedback module 250 for receiving the at least one feedback voltage. The regulating capacitor is primarily used for regulating a corresponding driving voltage with a charged and fixed voltage difference. For example, the regulating capacitor may be either one of the capacitors C12, C22, C32, . . . , C72, C82, . . . , and C152, for regulating driving voltages V1, V2, . . . , and V15 respectively. The resistor may be either one of the resistors R1, R2, R3, . . . , R8, . . . , and R15. As shown in FIG. 2, the plurality of pixel electrode driving modules P1, P2, P3, . . . , and P15 respectively provide driving voltages V1, V2, . . . , V7, V8, . . . , and V15 for driving a corresponding pixel electrode, which is not illustrated for brevity, on the panel 340. Note that the display panel driving circuit 200 further includes a resistor R16, which is coupled to a terminal of the resistor R15 and is for maintaining a voltage difference between the driving voltage V15 and ground, where the driving voltage V15 is higher than the ground in voltage level.

The voltage feedback module 250 includes a first switch SW1 and a second switch SW2. The first switch SW1 has a first terminal coupled to ground, and has a second terminal coupled to the panel 340. The second switch SW2 has a first terminal coupled to the first terminal of the first switch SW1, and has a second terminal coupled to the panel 340 for receiving the common voltage FV.

The voltage feedback module 250 has one of the first and second switches SW1 and SW2 to be switched on according to different requirements in the fabrication procedure of the display panel 300. It indicates that the voltage feedback module 250 has the switched-on switch to be close-circuited, while the other switch is open-circuited, for determining which one among the ground voltage and the common voltage FV to be fed-back to the driving voltages V1, V2, . . . , and V15 through the capacitors C12, C22, . . . , and C152 respectively. Moreover, after the fabrication procedure of the display panel 300 is completed, preferably, statuses of both the switches SW1 and SW2 are not changed anymore. While having the first switch SW1 conducted and having the second switch SW2 un-conducted by setting components on a circuit board in an unchangeable manner, such as burning information on the circuit board, the display panel driving circuit 200 does not receive the fed-back common voltage FV so that the condition of the display panel driving circuit 200 is the same with a conventional display panel driving circuit. Instead, while having the first switch SW1 un-conducted and having the second switch SW2 conducted, the display panel driving circuit 200 receives the fed-back common voltage FV. Note that the fed-back common voltage FV is coupled by noises within the common voltage source ArrayCOM. Therefore, while the display panel driving circuit generates the driving voltages V1, V2, . . . , and V15 and inputs the generated driving voltages into the panel 340, noises coupled to the input driving voltages may be close to synchronous with noises within the common voltage FV so that the horizontal crosstalk is relieved.

Figure 4:
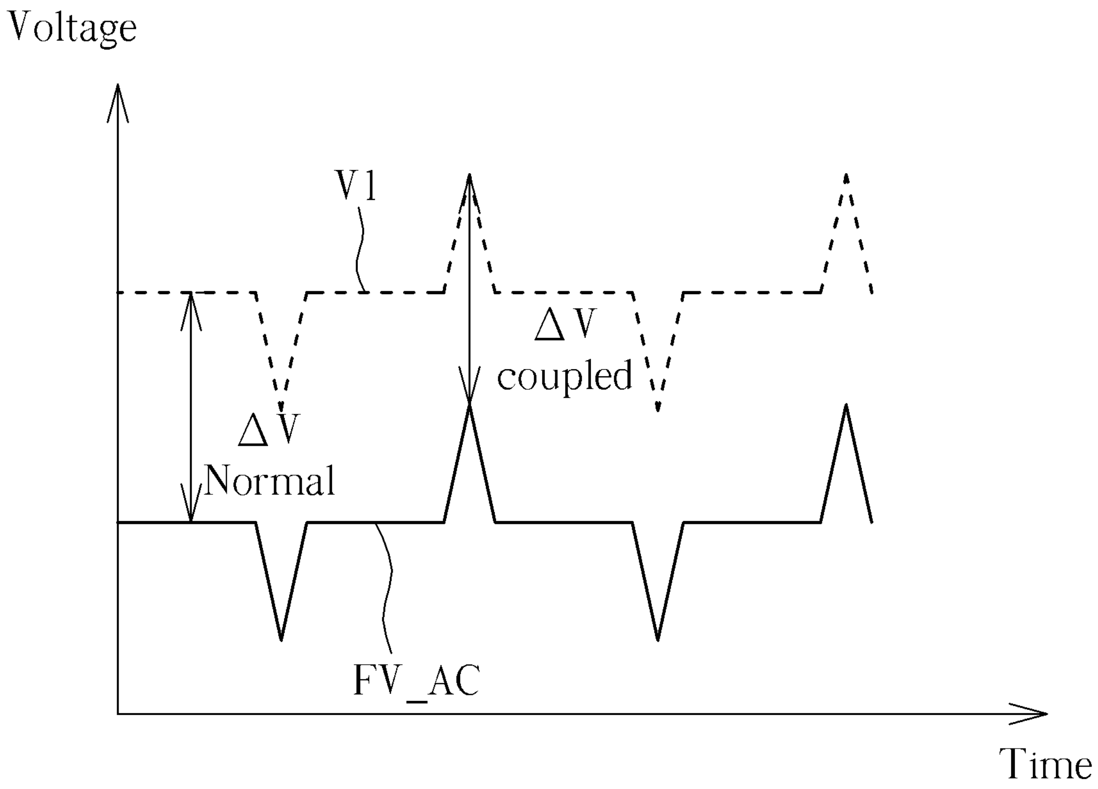
FIG. 4 is a schematic diagram of compensating effects of noises by the display panel driving circuit shown in FIG. 2.

Please refer to FIG. 4, which is a schematic diagram of compensating effects of noises by the display panel driving circuit 200 shown in FIG. 2. In FIG. 4, peaks shown in the driving voltage V1 shown in FIG. 2 are brought by noises coupled on the panel 340. However, after introducing a voltage FV_AC, which is generated within the common voltage FV according to a corresponding regulating capacitor C21, as shown in FIG. 4, a voltage difference between the driving voltage V1 and the voltage FV_AC is ΔVnormal while no noises are brought in, and the voltage difference becomes ΔVcoupled while noises are brought in. As can be observed in FIG. 4, the voltage differences ΔVnormal and ΔVcoupled are close to each other so that the difference between the driving voltage V1 and the voltage FV_AC is close to a constant even if there are peaks. As a result, while noises are brought in, and while the driving voltage V! is inputted into the panel 340 along with the voltage FV_AC, the driven pixel electrodes on the panel 340 are ensured to be prevented from horizontal crosstalk.

Figure 5:
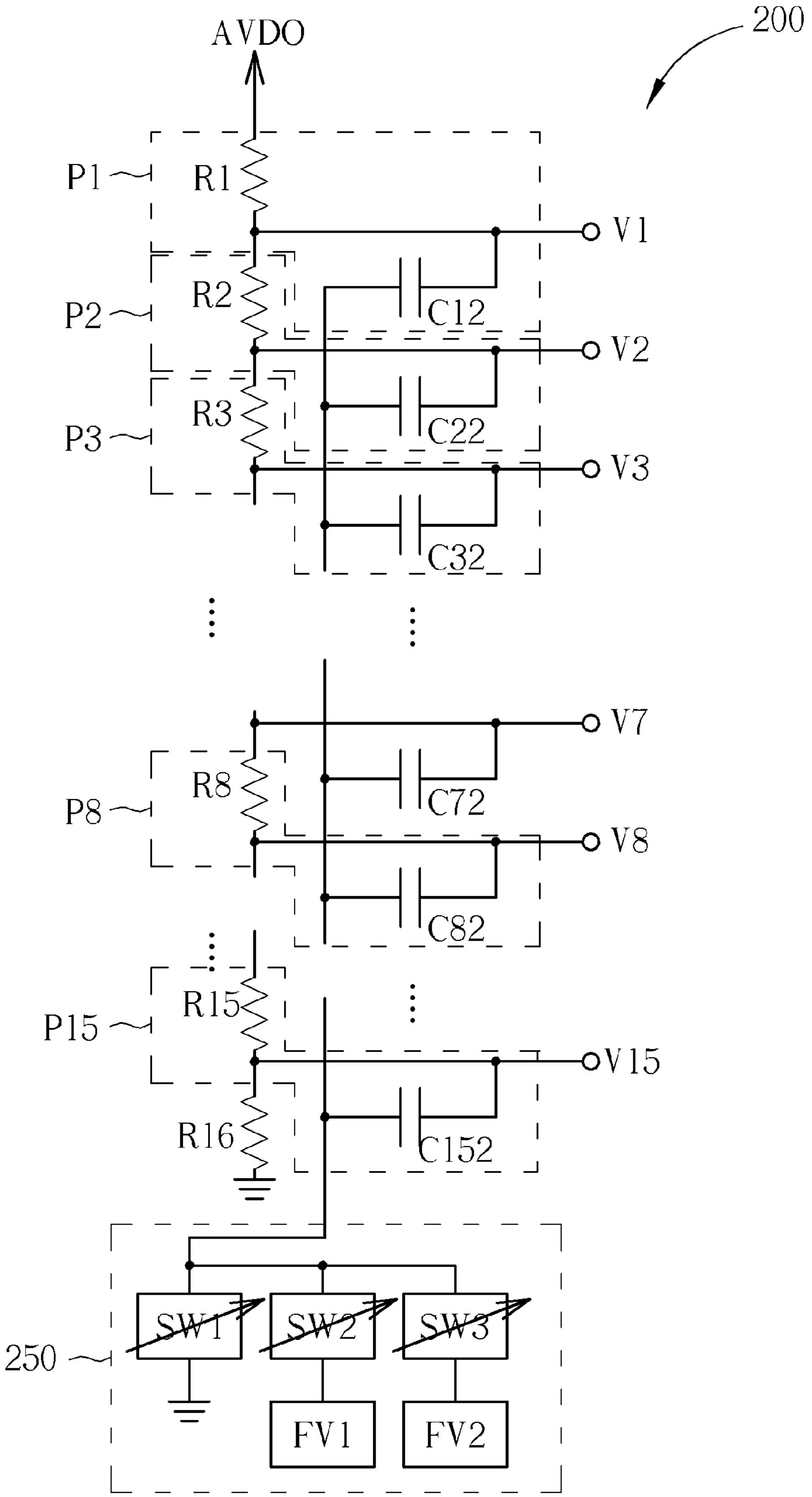
FIG. 5 is a diagram of the display panel driving circuit disclosed according to a third embodiment of the present invention.
Figure 6:
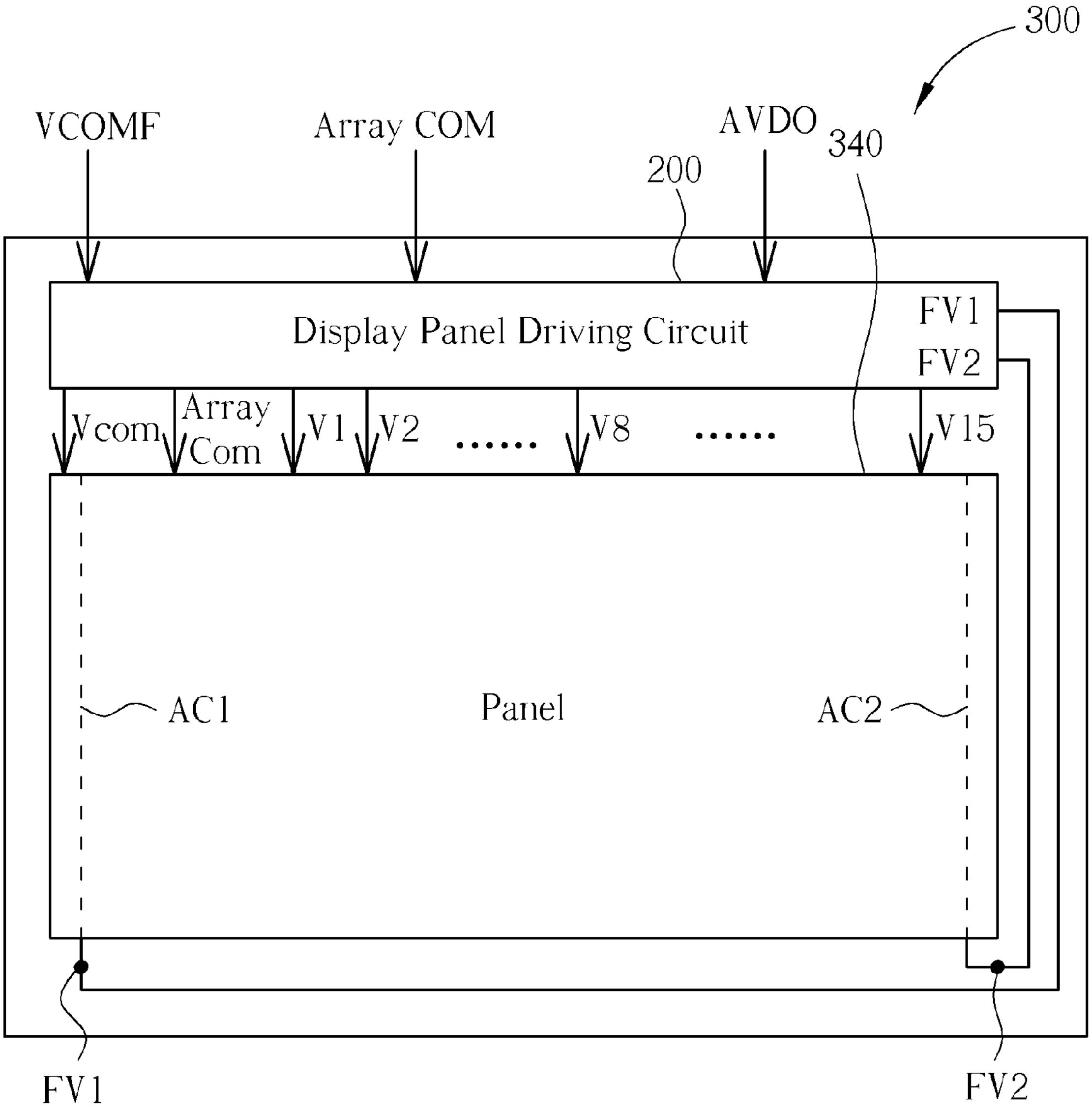
FIG. 6 is a diagram of a display panel including the display panel driving circuit shown in FIG. 5.

Please refer to FIG. 5 and FIG. 6. FIG. 5 is a diagram of the display panel driving circuit 200 disclosed according to a third embodiment of the present invention. FIG. 6 is a diagram of a display panel 300 including the display panel driving circuit 200 shown in FIG. 5. A major difference between embodiments shown in FIGS. 5 and 6 and FIGS. 2 and 3 lies in an additional switch SW3 is used in the display panel driving circuit 200 shown in FIG. 5, and lies in common voltages FV1 and FV2 respectively used on left/right sides of the panel 340 shown in FIG. 6. For example, a first common voltage wire AC1 is disposed at a left side on the panel 340, and a second common voltage wire AC2 is disposed on a right side on the panel 340. The common voltage wires AC1 and AC2 respectively provide the common voltages FV1 and FV2 without affecting transistor distribution within the panel 340 and display qualities on the left/right sides of the display panel 300. Both the first and second common voltages FV1 and FV2 are provided by the above-mentioned common voltage source ArrayCOM coupled to the display panel driving circuit 200. While the common voltage source ArrayCOM is provided to the panel 340 through the first and second common voltage wires AC1 and AC2, noises coupled from ground capacitors of each pixel electrode on the panel 340 are coupled to both the first and second common voltages FV1 and FV2. The display panel driving circuit 200 shown in FIG. 5 receives both the common voltages FV1 and FV2 along with the coupled noises from the panel 340.

The voltage feedback module 250 shown in FIG. 5 further includes the third switch SW3 in addition to both the first and second switches SW1 and SW2. Note that the third switch SW3 has a first terminal coupled to the first terminal of the first switch SW1, and has a second terminal coupled to the panel 340 for receiving the common voltage FV2.

The voltage feedback module 250 also has one of the switches SW1, SW2, and SW3 conducted according to different requirements in fabrication procedures of the display panel 300. After the fabrication procedure of the display panel 300 is completed, statuses of the switches SW1, SW2, and SW3 are preferably not changed anymore. By conducting either one of the switches SW2 and SW3 to introduce the common voltage FV1 or FV2 into the driving voltages V1, V2, . . . , and V15, noises within the driving voltages V1, V2, . . . , and V15 may be close to synchronous to noises within the common voltage FV1 or FV2 so that the horizontal crosstalk is relieved.

Figure 7:
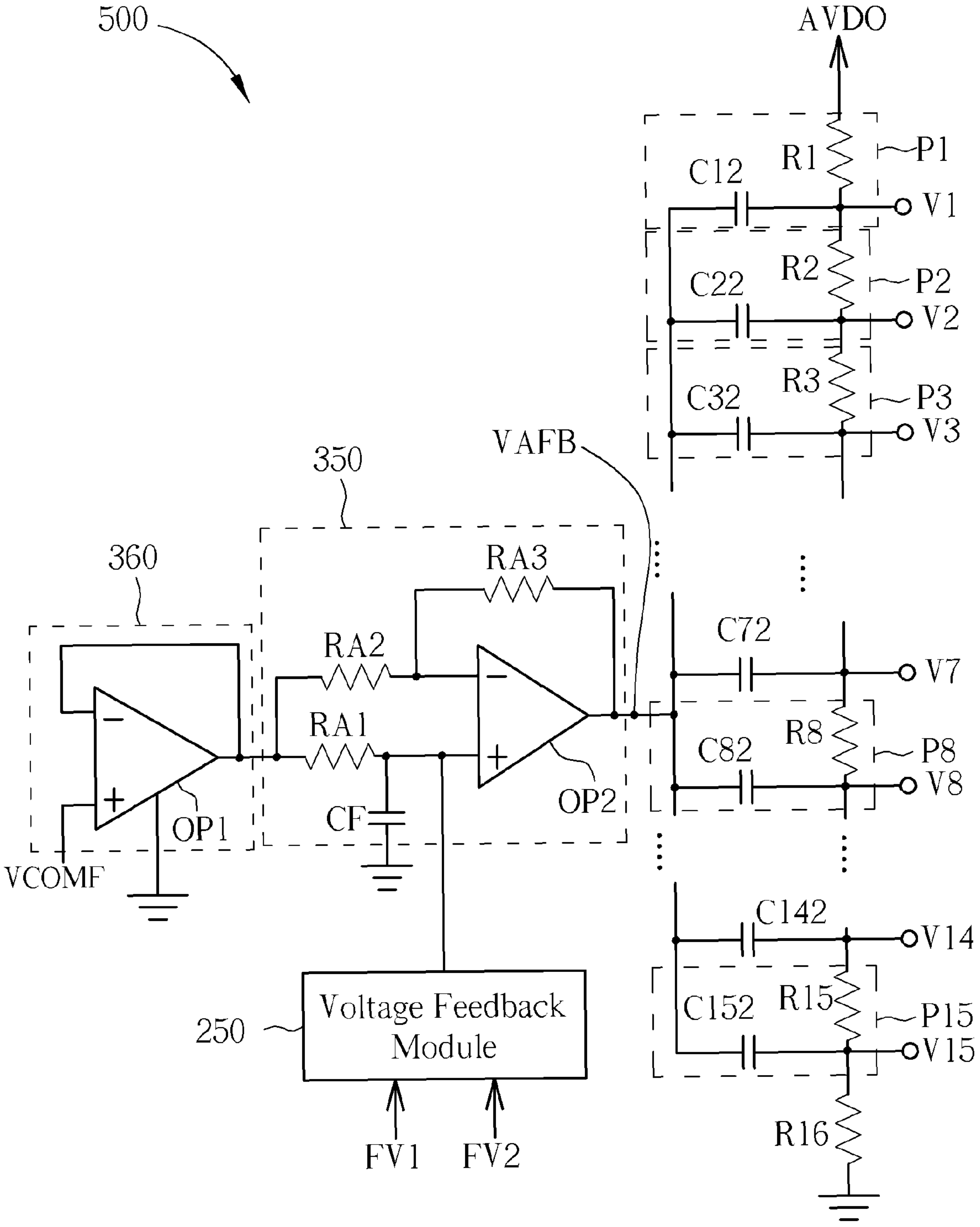
FIG. 7 is a diagram of a display panel driving circuit disclosed according to a second embodiment of the present invention.

Please refer to FIG. 7, which is a diagram of a display panel driving circuit 500 disclosed according to a second embodiment of the present invention. As shown in FIG. 7, the display panel driving circuit 500 further includes a voltage amplifying module 350 and a buffering module 360 than the display panel driving circuit 200 shown in FIGS. 2 and 5.

In FIG. 7, the buffering module is used for buffering the common voltage level VCOMF, which occupies a same definition as mentioned in FIGS. 2 and 5. The voltage amplifying module 350 is coupled to the buffering module 360 and the voltage feedback module 250 for respectively receiving the common voltage level VCOMF and either one of the common voltages FV1 and FV2, where operations of the voltage feedback module 250 are the same as described above. The voltage amplifying module 350 amplifies a voltage difference between the common voltage level VCOMF and either one of the common voltages FV1 and FV2 to generate an amplified feedback voltage VAFB. The voltage amplifying module 350 is also coupled to each one of the plurality of pixel electrode driving modules P1, P2, P3, . . . , P7, P8, . . . , and P15, for respectively transmitting the amplified feedback voltage VAFB to the plurality of pixel electrode driving modules P1, P2, P3, . . . , P7, P8, . . . , and P15.

The buffering module 360 includes a first operational amplifier OP1, which has a positive input terminal coupled to the common voltage level VCOMF, and has a negative terminal coupled to an output terminal of the first operational amplifier OP1. With such depositions, the common voltage level VCOMF may be continuously amplified at the output terminal of the first operational amplifier OP1 while the common voltage level VCOMF continuously raises itself, and the common voltage level VCOMF may be continuously attenuated at the output terminal of the first operational amplifier OP1 while the common voltage level VCOMF continuously lowers itself, so that the common voltage level VCOMF may be buffered in a delayed manner. The voltage amplifying module 350 includes a second operational amplifier OP2, a first resistor RA1, a second resistor RA2, a third resistor RA3, and a filtering capacitor CF. The second operational amplifier OP2 has an output terminal coupled to the plurality of pixel electrode driving modules P1, P2, P3, . . . , P7, P8, . . . , and P15, for outputting the amplified feedback voltage VAFB, and has a positive input terminal coupled to the voltage feedback module 250 for receiving either one of the common voltages FV1 and FV2. The first resistor RA1 has a first terminal coupled to the positive input terminal of the second operational amplifier OP2, and has a second terminal coupled to the output terminal of the first operational amplifier OP1. The second resistor RA2 has a first terminal coupled to an negative input terminal of the second operational amplifier OP2, and has a second terminal coupled to the second terminal of the first resistor RA1. The third resistor RA3 has a first terminal coupled to the negative input terminal of the second operational amplifier OP2, and has a second terminal coupled to the output terminal of the second operational amplifier OP2. The filtering capacitor CF has a first terminal coupled to the positive input terminal of the second operational amplifier OP2, and has a second terminal coupled to ground.

The first resistor RA1 and the filtering capacitor CF are used for regulating both the buffered common voltage level VCOMF and the feedback voltage provided by the voltage feedback module 250. The second and third resistor RA2 and RA3 are used for generating divided voltages of the amplified feedback voltage VAFB. The voltage amplifying module 350 amplifies the voltage difference between the common voltage level VCOMF and the at least one feedback voltage, for example, the common voltages FV1 and FV2, to generate the amplified feedback voltage VAFB, and inputs the amplified feedback voltage VAFB into the plurality of pixel electrode driving module P1', P2', P3', . . . , P7', P8', . . . , and P15', for driving corresponding pixel electrodes within the panel 340. Similarly, under the condition that the amplified feedback voltage VAFB brings noises coupled from the common voltage FV1 or FV2, while driving the panel 340 with the aid of the driving voltages V1, V2, . . . , and V15, noises from both sides are close to be synchronous so that horizontal crosstalk is relieved and the display quality of the display panel 340 is improved as a result.

The display panel driving circuit 500 shown in FIG. 7 may be used for replacing the display panel driving circuit 200 of the display panel 300 shown in FIGS. 3 and 6 to form other embodiments of the present invention.

Figure 8:
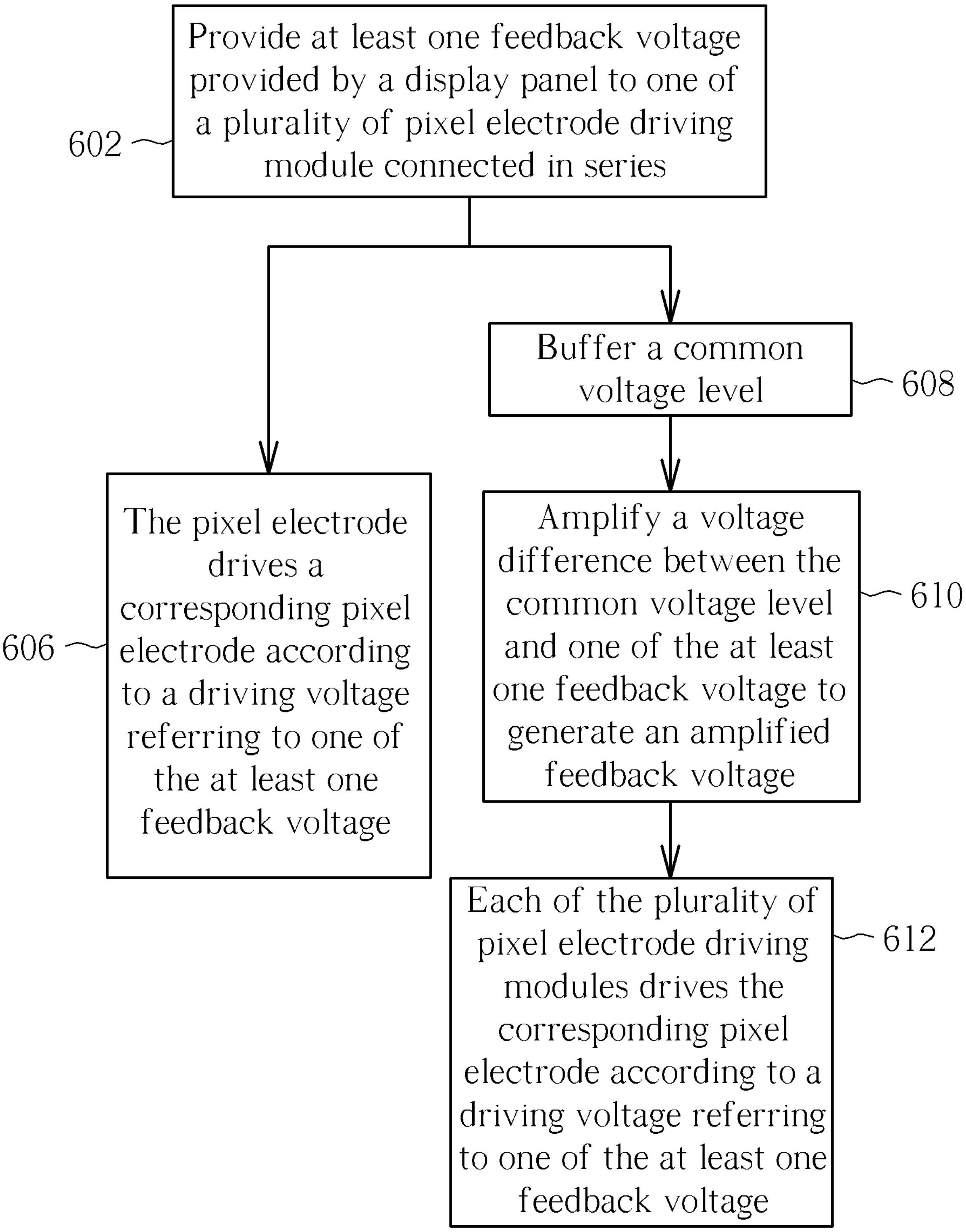
FIG. 8 is a flowchart of the method of driving a display panel for relieving horizontal crosstalk according to an embodiment of the present invention.

Please refer to FIG. 8, which is a flowchart of the method of driving a display panel for relieving horizontal crosstalk according to an embodiment of the present invention, where the method may be applied on the display panel driving circuits 200 and 500 respectively shown in FIGS. 2, 5, and 7. The method includes steps as follows:

Step 602: Provide at least one feedback voltage provided by a display panel to one of a plurality of pixel electrode driving module connected in series.

Step 606: The pixel electrode driving module drives a corresponding pixel electrode according to a driving voltage referring to one of the at least one feedback voltage.

Step 608: Buffer a common voltage level.

Step 610: Amplify a voltage difference between the common voltage level and one of the at least one feedback voltage to generate an amplified feedback voltage.

Step 612: Each of the plurality of pixel electrode driving modules drives the corresponding pixel electrode according to a driving voltage referring to one of the at least one feedback voltage.

In steps shown in FIG. 8, Steps 602 and 606 are implemented by the display panel driving circuit 200 shown in FIG. 2 or FIG. 5, the Steps 602, 608, 610, and 621 are implemented by the display panel driving circuit 500 shown in FIG. 7. Embodiments formed by reasonable combinations and permutations of steps shown in FIG. 8 or formed by adding restrictions mentioned above should also be regarded as embodiments of the present invention.

The present invention discloses a display panel driving circuit, a display panel including the disclosed display panel driving circuit, and a driving method implemented on the disclosed display panel driving method. With the aid of the property that there are noises in at least one common voltage used by the display panel, the at least one common voltage is fed-back to pixel electrode driving modules so that driving voltages of corresponding pixel electrodes may bring coupled noises while entering the display panel to compensate noises within the display panel. As a result, Each the pixel electrode driving module may drives a corresponding pixel electrode with a stable voltage difference since noises from the display panel are compensated, and horizontal crosstalk on the display panel is thus relieved to raise the display quality of the display panel.

Those skilled in the art will readily observe that numerous modifications and alterations of the device and method may be made while retaining the teachings of the invention.

What is claimed is:

1. A display panel driving circuit, comprising:

a plurality of pixel electrode driving modules connected in series, each of the pixel electrode driving modules comprising a resistor connected to another resistor of an adjacent pixel electrode driving module in series for outputting a plurality of different driving voltages to corresponding pixel electrodes according to a voltage source for required power, and a regulating capacitor for regulating the corresponding driving voltage with a charged and fixed voltage difference; and a voltage feedback module coupled to one of the plurality of pixel electrode driving module for providing the coupled pixel electrode driving module with at least one feedback voltage, wherein the at least one feedback voltage is a common voltage used by a display panel as a required common voltage level while a transistor array of the display panel stores voltages;

wherein each of the pixel electrode driving module is capable of driving the corresponding pixel electrode according to the corresponding driving voltage referring to the at least one feedback voltage, so that a difference of voltage level between ripples of the corresponding driving voltage and the at least one feedback voltage is close to a constant;

wherein the regulating capacitor has a first terminal directly coupled to the voltage feedback module for receiving the at least one feedback voltage, and a second terminal directly coupled to a first terminal of the resistor.

2. The display panel driving circuit of claim 1, wherein the voltage feedback module comprises:

a first switch having a first terminal coupled to one of the plurality of pixel electrode driving modules, and having a second terminal coupled to ground; and a second switch having a first terminal coupled to the first terminal of the first switch, and having a second terminal coupled to a display region of the display panel for receiving a first feedback voltage of the at least one feedback voltage.

3. The display panel driving circuit of claim 1, wherein the second terminal of the regulating capacitor is coupled to a pixel electrode driven by each of the plurality of pixel electrode driving modules.

4. The display panel driving circuit of claim 1, wherein the display panel driving circuit further comprises:

a voltage difference resistor having a first terminal coupled to one of the pixel electrode driving modules, and having a second terminal coupled to ground.

5. The display panel driving circuit of claim 1 further comprising:

a voltage amplifying module coupled to the voltage feedback module for receiving the at least one feedback voltage, the voltage amplifying module amplifying a voltage difference between a common voltage level and one of the at least one feedback voltage for generating an amplified feedback voltage, and the voltage amplifying module being coupled to each of the plurality of pixel electrode driving modules for transmitting the amplifying feedback voltage to each of the plurality of pixel electrode driving module;

wherein each of the plurality of pixel electrode driving module is capable of driving the corresponding pixel electrode according to a driving voltage referring to the amplified feedback voltage.

6. The display panel driving circuit of claim 5, wherein the second terminal of the regulating capacitor is coupled to a pixel electrode driven by each of the pixel electrode driving circuits.

7. The display panel driving circuit of claim 5, wherein the display panel driving circuit further comprises:

a voltage difference resistor having a first terminal coupled to one of the plurality of pixel electrode driving module, and having a second terminal coupled to ground.

8. The display panel driving circuit of claim 5 further comprising:

a buffering module coupled to the voltage amplifying module for buffering the common voltage level.

9. The display panel driving circuit of claim 8, wherein the buffering module comprises:

a first operational amplifier having a positive input terminal coupled to the common voltage level, and having a negative input terminal coupled to an output terminal of the first operational amplifier;

wherein the voltage amplifying module comprises:

a second operational amplifier having an output terminal coupled to each of the plurality of pixel electrode driving module for outputting the amplifying feedback voltage, and having a positive input terminal coupled to the voltage feedback module for receiving the at least one feedback voltage.

10. The display panel driving circuit of claim 9, wherein the voltage amplifying module further comprises:

a first resistor having a first terminal coupled to the positive input terminal of the second operational amplifier, and having a second terminal coupled to the output terminal of the first operational amplifier;

a second resistor having a first terminal coupled a negative input terminal of the second operational amplifier, and having a second terminal coupled to the second terminal of the first resistor;

a third resistor having a first terminal coupled to the negative input terminal, and having a second terminal coupled to the output terminal of the second operational amplifier; and a filtering capacitor having a first terminal coupled to the positive input terminal of the second operational amplifier, and having a second terminal coupled to ground.

11. The display panel driving circuit of claim 5, wherein the common voltage level indicates a reference level of a driving voltage difference of a pixel electrode, and a voltage difference between a driving voltage of a single pixel electrode and the common voltage level indicates a practically-used voltage difference in driving the pixel electrode.

12. A driving method, comprising:

providing the display panel driving circuit of claim 1;

providing the at least one feedback voltage to one of the plurality of pixel electrode driving modules connected in series, wherein the at least one feedback voltage is the common voltage coupled with the first noise and used by the display panel as the required common voltage level while the transistor array of the display panel stores voltages; and driving the corresponding pixel electrode according to the corresponding driving voltage coupled with the second noise referring to one of the at least one provided feedback voltage;

wherein the first noise and the second noise are synchronized and have the same amplitude.

13. The driving method of claim 12 further comprising:

amplifying a voltage difference between a common voltage level and one of the at least one feedback voltages for generating an amplified feedback voltage; and wherein the driving step includes driving the corresponding pixel electrode according to the driving voltage referring to the amplified feedback voltage.

14. The driving method of claim 13 further comprising:

buffering the common voltage level.

15. The driving method of claim 14, wherein the common voltage level indicates a reference voltage of a driving voltage difference of a pixel electrode, and a voltage difference between a driving voltage of a single pixel electrode and the common voltage level indicates a used voltage difference for driving the pixel electrode.

16. A display panel, comprising:

a panel; and a display panel driving circuit, comprising:

a plurality of pixel electrode driving modules connected in series, each of the pixel electrode driving modules comprising a resistor connected to another resistor of an adjacent pixel electrode driving module in series for outputting a plurality of different driving voltages to corresponding pixel electrodes according to a voltage source for required power, and a regulating capacitor for regulating the corresponding driving voltage with a charged and fixed voltage difference; and a voltage feedback module coupled to one of the plurality of pixel electrode driving module for providing the coupled pixel electrode driving module with at least one feedback voltage, wherein the at least one feedback voltage is a common voltage used by a display panel as a required common voltage level while a transistor array of the display panel stores voltages;

wherein each of the pixel electrode driving module is capable of driving the corresponding pixel electrode according to the corresponding driving voltage referring to the at least one feedback voltage, so that a difference of voltage level between ripples of the corresponding driving voltage and the at least one feedback voltage is close to a constant;

wherein the regulating capacitor has a first terminal directly coupled to the voltage feedback module for receiving the at least one feedback voltage, and a second terminal directly coupled to a first terminal of the resistor.

17. The display panel of claim 16, wherein the voltage feedback module comprises:

a first switch having a first terminal coupled to one of the plurality of pixel electrode driving modules, and having a second terminal coupled to ground; and a second switch having a first terminal coupled to the first terminal of the first switch, and having a second terminal coupled to a display region of the panel for receiving a first feedback voltage of the at least one feedback voltage.

18. The display panel of claim 16, wherein the second terminal of the regulating capacitor is coupled to a pixel electrode driven by each of the plurality of pixel electrode driving modules.

19. The display panel of claim 16, wherein the display panel driving circuit further comprises:

a voltage difference resistor having a first terminal coupled to the pixel electrode driving module, and having a second terminal coupled to ground.

20. The display panel of claim 16 further comprising:

a voltage amplifying module coupled to the voltage feedback module for receiving the at least one feedback voltage, the voltage amplifying module amplifying a voltage difference between a common voltage level and one of the at least one feedback voltage for generating an amplified feedback voltage, and the voltage amplifying module being coupled to one of the plurality of pixel electrode driving modules for transmitting the amplifying feedback voltage to one of the plurality of pixel electrode driving module;

wherein each of the plurality of pixel electrode driving module is capable of driving the corresponding pixel electrode according to a driving voltage referring to the amplified feedback voltage.

21. The display panel of claim 20, wherein the second terminal of the regulating capacitor is coupled to a pixel electrode driven by each of the pixel electrode driving circuits.

22. The display panel of claim 20, wherein the display panel driving circuit further comprises:

a voltage difference resistor having a first terminal coupled to one of the plurality of pixel electrode driving module, and having a second terminal coupled to ground.

23. The display panel of claim 20 further comprising:

a buffering module coupled to the voltage amplifying module for buffering the common voltage level.

24. The display panel of claim 23, wherein the buffering module comprises:

a first operational amplifier having a positive input terminal coupled to the common voltage level, and having a negative input terminal coupled to an output terminal of the first operational amplifier;

wherein the voltage amplifying module comprises:

a second operational amplifier having an output terminal coupled to each of the plurality of pixel electrode driving module for outputting the amplifying feedback voltage, and having a positive input terminal coupled to the voltage feedback module for receiving the at least one feedback voltage.

25. The display panel of claim 24, wherein the voltage amplifying module further comprises:

a first resistor having a first terminal coupled to the positive input terminal of the second operational amplifier, and having a second terminal coupled to the output terminal of the first operational amplifier;

a second resistor having a first terminal coupled a negative input terminal of the second operational amplifier, and having a second terminal coupled to the second terminal of the first resistor;

a third resistor having a first terminal coupled to the negative input terminal, and having a second terminal coupled to the output terminal of the second operational amplifier; and a filtering capacitor having a first terminal coupled to the positive input terminal of the second operational amplifier, and having a second terminal coupled to ground.

* * * * *